United States Patent [19]

Antoszewski et al.

[11] Patent Number: 4,684,312
[45] Date of Patent: Aug. 4, 1987

[54] ROBOTIC WRIST

[75] Inventors: Richard S. Antoszewski, Glenshaw; Daniel P. Soroka, Imperial, both of Pa.

[73] Assignee: Westinghouse Electric Corp., Pittsburgh, Pa.

[21] Appl. No.: 844,242

[22] Filed: Mar. 24, 1986

Related U.S. Application Data

[63] Continuation of Ser. No. 605,495, Apr. 30, 1984, abandoned.

[51] Int. Cl.[4] ............................................. B25J 17/02
[52] U.S. Cl. .................................. 414/735; 414/751; 901/16; 901/29; 74/479
[58] Field of Search ............... 414/749, 751, 753, 735; 901/16, 27-29, 50, 30, 23, 24; 74/469, 479

[56] References Cited

U.S. PATENT DOCUMENTS 4,096,766 6/1978 Pardo et al. ..................... 414/1 X
4,370,091 1/1983 Gagliardi ........................... 414/735
4,398,110 8/1983 Flinchbaugh ..................... 901/23

FOREIGN PATENT DOCUMENTS 1455782 11/1976 United Kingdom ............... 414/753

Primary Examiner—Robert J. Spar
Assistant Examiner—Donald W. Underwood
Attorney, Agent, or Firm—Thomas R. Trempus

[57] ABSTRACT

The invention provides a modular robotic wrist system for use with an industrial manipulator or the like. The individual modular units comprise a mounting bracket, an A axis module which is attachable to the mounting bracket and provides rotational movement about a first axis, a B axis module which is mountable either directly to the mounting bracket or to the A axis module to provide either rotational movement about a second axis or additional rotational movement about the second axis in conjunction with the rotational movement provided by the A axis module about a first axis and tool-mounting flanges which can be used in conjunction with the B axis module to provide rotational movement of an end effector either on the second axis or radially spaced about the second axis. Each of the modular units has a rotating member which is driven by a high-speed, low-torque DC motor coupled to a harmonic drive unit. The individual modules can be provided with position feedback mechanisms which provide both speed and locational information.

7 Claims, 11 Drawing Figures

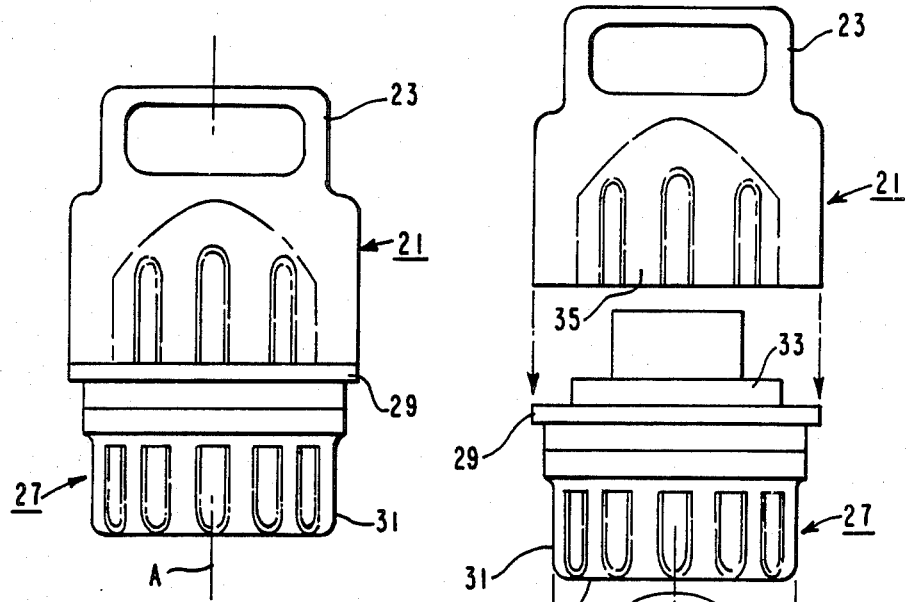
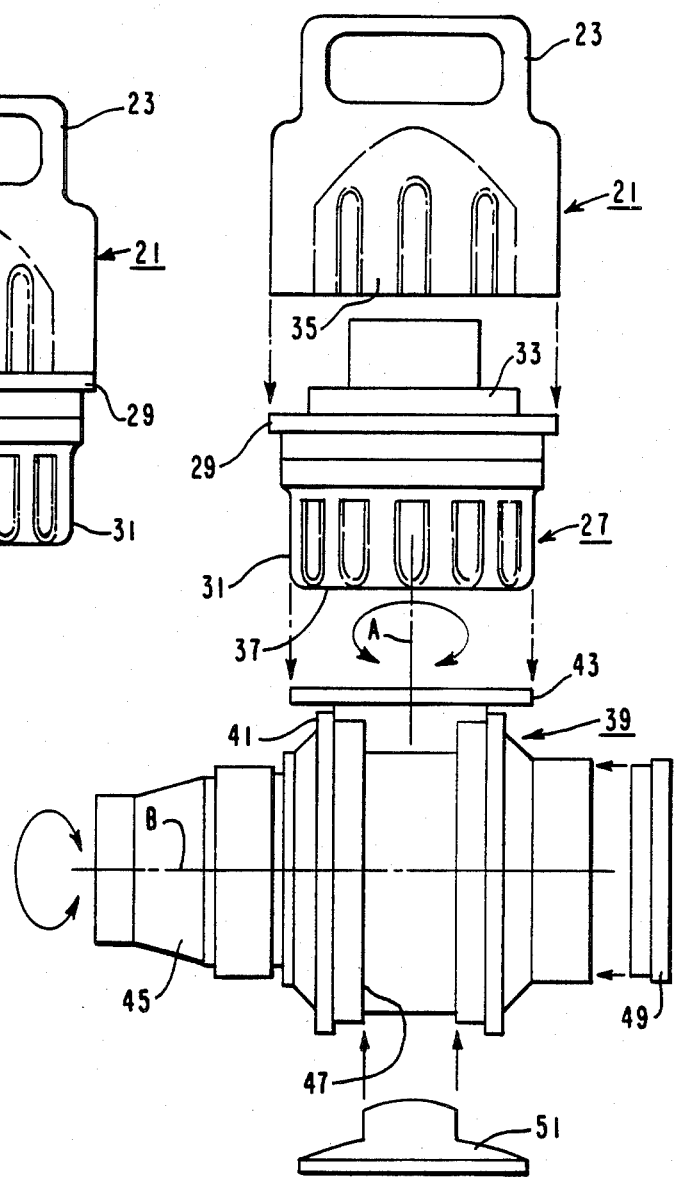
FIG. 3
FIG. 2

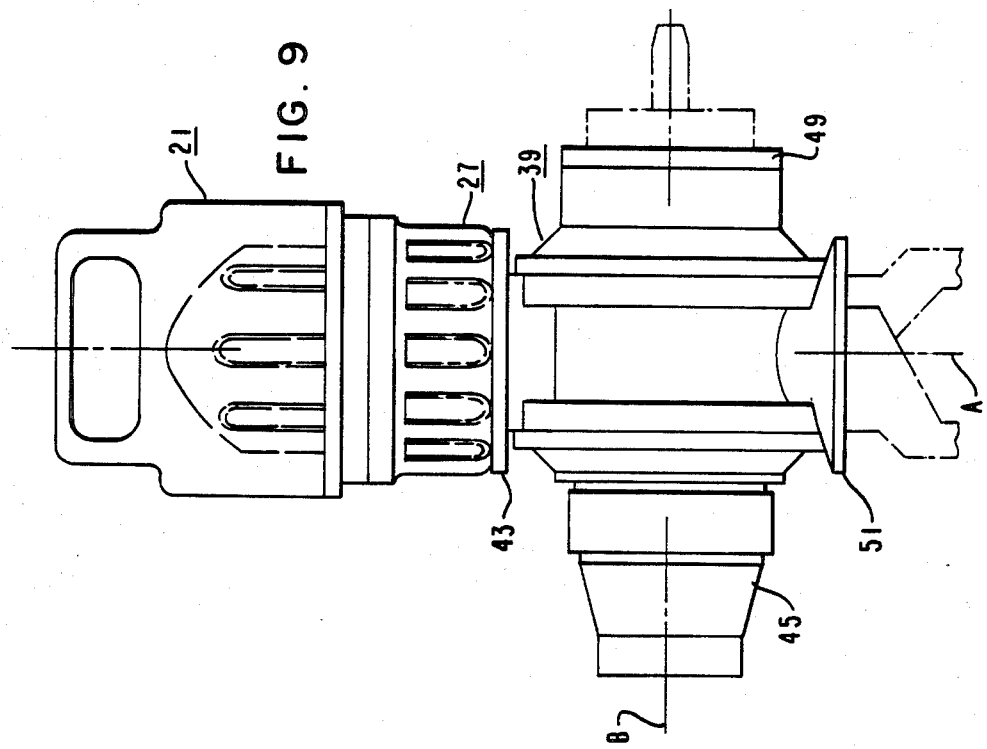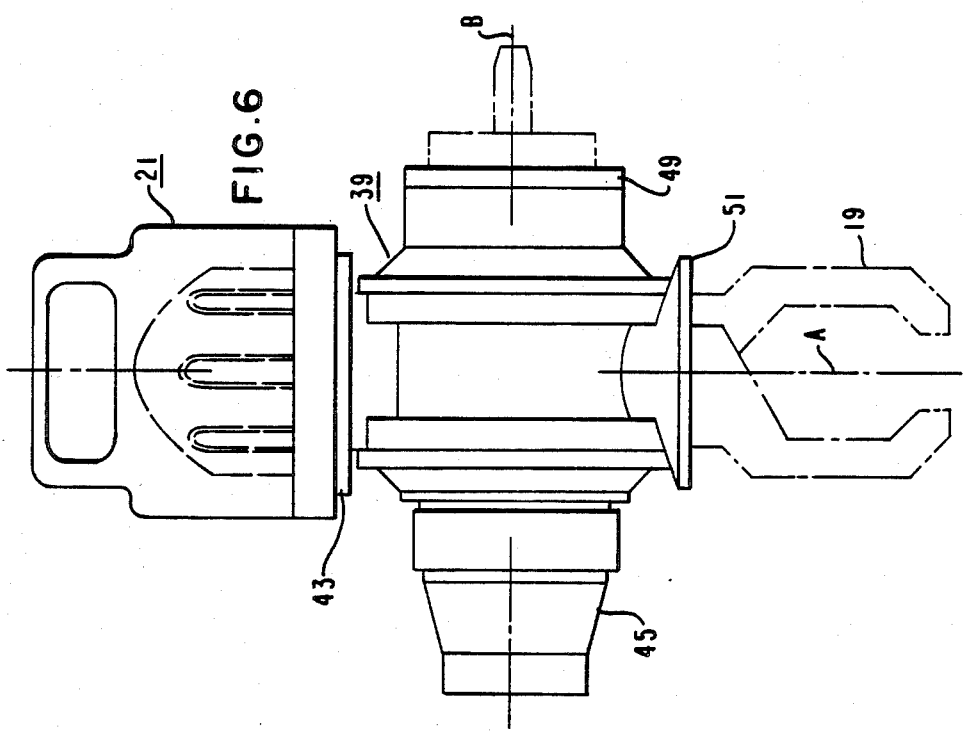

ROBOTIC WRIST

This is application is a continuation of application Ser. No. 605,495, filed Apr. 30, 1984, now abandoned.

FIELD OF THE INVENTION

The invention generally relates to the field of robotics. More particularly, the invention is directed to an improved robotic wrist which offers both modular design and one or two axis multi-flange wrist capability.

BACKGROUND OF THE INVENTION

The general acceptance of industry automation as an essential requirement for improving productivity has increased the acceptance of the robot as a mechanism for achieving automated industrial applications. Numerous robotic configurations have been designed to meet specific industrial needs, for example, cutting, welding, assembly, material handling, etc. The designs of many commercially available robots are unique to a particular application and employ complex mechanical design features and sophisticated control functions dedicated to the specific industrial application.

A robot must be able to reach work pieces and tools. Typically, this requires a combination of an arm and a wrist subassembly plus a hand which is commonly called an end effector. The robot's sphere of influence is based upon the volume or sphere of influence into which the robot's arm can deliver the wrist subassembly. A variety of geometric configurations have been studied and tried and the relative kinematic capabilities appraised. Each of the several geometric configurations offers a different shape to its sphere of influence, the total volume of which depends upon the arm link lengths. For different applications, different configurations are typically appropriate. A revolute arm might be best for reaching into a container, while a cylindrical arm might be best suited to a straight thrust between the dies of a punching press.

In any event, the arm carries a wrist assembly mounted thereon to orient its end effector as required by workpiece placement. Commonly, the wrist provides three articulations that offer motions labeled "Pitch", "Yaw" and "Roll". It is common practice for any of the arm coordinate systems to use up to three articulations to deliver the wrist assembly anywhere into a sphere of influence. In addition to this, it is the common practice to require three more articulations in the wrist for universal orientation of the end effector.

It is an object of this invention to provide a modular multi-flange robotic wrist which provides one or two independent, controllable, degrees of freedom to enhance the basic motions of a robotic manipulator.

It is a further object of this invention to provide a robotic wrist with the capability to turn a part upside down with the axis of rotation of the part coincident with either axis of rotation of the wrist.

It is thus another object of this invention to eliminate the need for a three-axis wrist in the majority of robotic applications.

It is yet another object of this invention to provide a modular one- or two-axis multi-flange robotic wrist.

SUMMARY OF THE INVENTION

This invention is directed to a modular one- or two-axis multi-flange capable robotic wrist system for use with an industrial manipulator. A first module defines a first wrist assembly comprising a housing with means therein for the detachable mounting of the wrist assembly to the industrial manipulator mounting bracket. A first accessory support means is rotatably mounted in the housing and first drive means are operably associated with the first housing and the accessory support means for affecting the rotational movement of the accessory support means relative to the housing about a first axis of rotation. A second modular wrist assembly comprises a housing having means thereon for the detachable mounting of this housing to the first accessory support means of the first module. Second accessory support means are rotatably mounted in the second housing and drive means are operatively associated therewith for affecting the rotational movement of the second accessory support means relative to the second housing along a second axis of rotation. The second axis of rotation is substantially perpendicular to the first axis of rotation of the first wrist assembly.

The accessory support means of the second modular wrist assembly includes at least one mounting flange operatively associated therewith and adapted to receive an industrial manipulator or the like thereon. The mounting flange can be operatively associated with the assembly support means for radially spaced rotation about the second axis. Alternately, the at least one mounting flange can be operatively associated with the accessory support means of the second module for rotation on the second axis. Additionally, the second accessory support means of the second module can include mounting flanges for rotation in a radially spaced relation about the second axis as well as on the axis itself so that two mounting flanges are rotating about a single axis. In this configuration, the mounting flanges would have a generally perpendicular relationship to one another.

The unique modular design of the present robotic wrist provides a multiplicity of combinations for industrial applications. For example, the first and second modules can be used together on a single robot arm, or either of the modules can be used independently. In either case, the second module can be provided with a single flange located in either of the positions described above, or with a pair of flanges.

BRIEF DESCRIPTION OF THE DRAWINGS

The above as well as other features and advantages of the present invention will become apparent through consideration of the detailed description in conjunction with the several drawings in which:

FIG. 2 is an exploded view of the several components which comprise the modular system of this invention, FIG. 3 is an elevational view of the A-axis module and mounting bracket, FIG. 6 is an elevational view of a B-axis module with bottom tool flange and side tool flange, disposed on a mounting bracket, FIG. 9 is an elevational view of an A- and B-axis module both disposed from a mounting bracket with the B-axis equipped with a bottom tool flange and side tool flange.

DETAILED DESCRIPTION OF THE INVENTION

Figure 1:
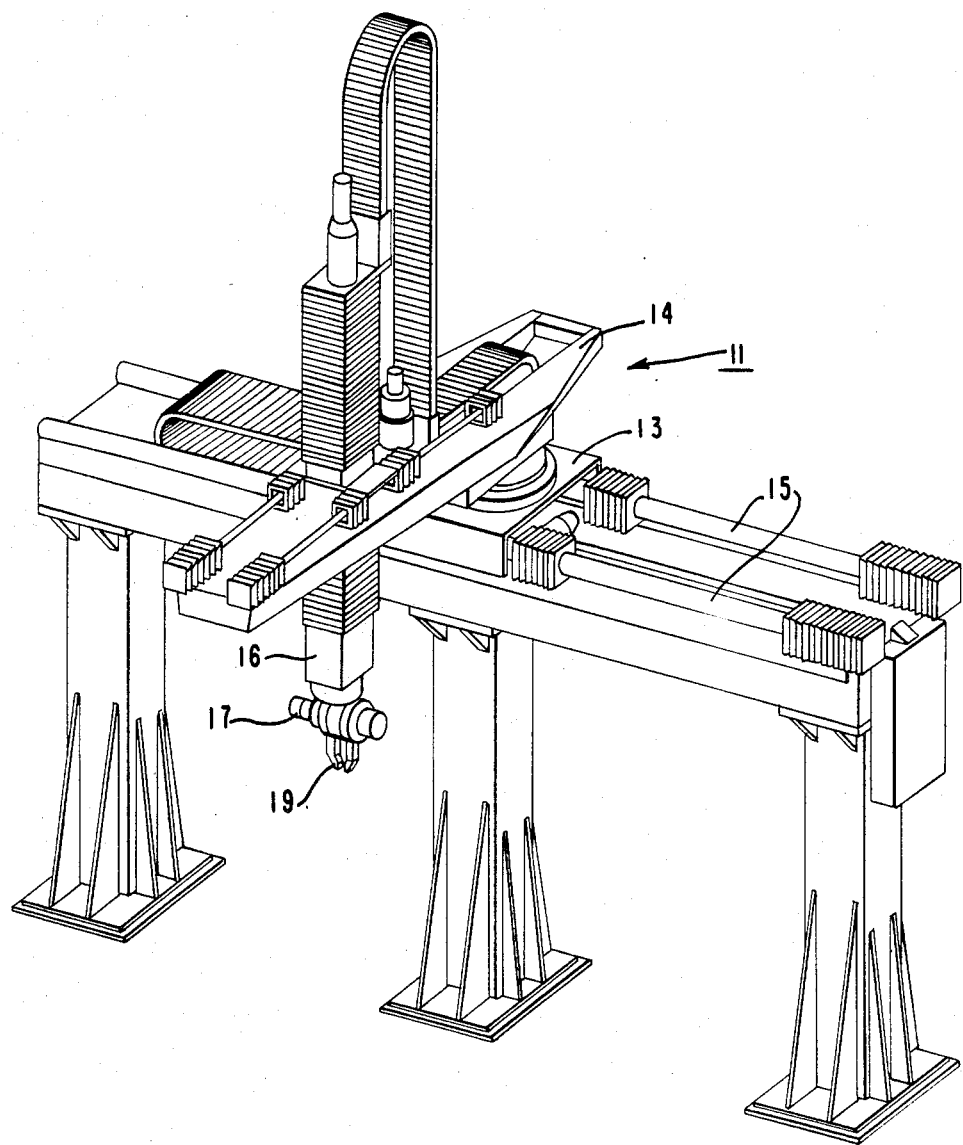
FIG. 1 is a somewhat schematical representation illustrating a rectangular coordinate robot with a modular robotic wrist according to the teachings of this invention disposed thereon.

The modular multi-flange robotic wrist according to this invention is a mechanism which provides one or two independent, electric servo controlled, degrees of freedom in order to enhance the basic motions of a robotic manipulator. Turning to FIG. 1, a schematic representation of an industrial manipulator is generally indicated by the reference character 11. Typically, such a manipulator 11 includes a base 13 on which is mounted a pivotable arm member 14, for controllable movement along tracks 15 by a drive means. In addition to pivotable movement on the base, 14, a second arm 16 can be elevated or depressed. In order to enhance the flexibility of such a robot the free end of the arm 16 is usually provided with a wrist member 17. The use of a wrist provides additional degrees of freedom in the articulation of an end effector 19 by the robot. The end effector is simply a tool selected to accomplish a particular task through the articulations of the industrial manipulator.

FIGS. 3-8 illustrate the variety of configurations made possible by the modular wrist of this invention. However, prior to considering each of the several configurations made possible through this modular design, attention is directed to FIG. 2 in which an exploded view of the several components which make up the modular system are illustrated. Common to each configuration is a mounting bracket 21 which is adapted to be removably mounted to the free end of the arm of an industrial manipulator. Means, as at 23, are provided at one end of the mounting bracket 21 for attaching the bracket to the robot arm. The means 23 would typically consist of bores through which bolts could be inserted and secured to a mounting flange on the robot arm. The opposite end of the mounting bracket 21 is provided with means 25 (illustrated as bolts in FIG. 10) for removably securing thereto either an A-axis module or a B-axis module. The A-axis module 27 includes a mounting plate 29 and a rotating member 31 rotatably mounted on the mounting plate 29. The A-axis module 27 provides a first degree of freedom consisting of rotational movement about a first or A-axis which is generally parallel with the arm of the robot onto which the A-axis module and mounting bracket are secured. The mounting plate 29 is adapted to be secured to the modular securing means 25 of the mounting bracket 21. Additionally the mounting plate 29 has secured thereon drive means schematically indicated at 33. The drive means 33 will be described in detail below in conjunction with FIG. 10. The mounting bracket 21 has a chamber-like interior 35 which is adapted to enclose the drive means 33 of the A-axis module when the A-axis module is mounted thereon. Drive means 33 are in communication with the rotating member 31 to provided the desired rotational movement thereof. The bottom portion 37 of the rotating member 31 is adapted to mountably receive thereon either the B-axis module 39 or a desired end effector. The B-axis module 39 includes a housing 41 which has a mounting plate 43 thereon. The mounting plate 43 is adapted to be secured to either the bottom 25 of the mounting bracket 21 or the bottom 37 of the A-axis, module 27. At a side of the housing of the B-axis, substantially perpendicular to the mounting plate 43, there is secured a drive means 45. This drive means will be described in detail hereinafter in conjunction with FIG. 11. A rotating member 47 is rotatably mounted in the B-axis housing 41 and is in mechanical communication with the drive means 45 for the controllable rotation thereof about a second or B-axis. The B-axis permits rotational movement along an axis which is substantially perpendicular to the A-axis rotation of the A-axis module 27. The rotating member 47 of the B-axis 39 is adapted to receive a tool flange 49 on the side thereof to provide rotational movement on the aforedescribed B-axis. Additionally, the rotating member 47 is adapted to receive a tool flange 51 along the bottom portion thereof for radially spaced rotation about the B-axis. As will be described below, the B-axis module can be provided with either a side tool flange 49, a bottom tool flange 51 or both tool flanges 49 and 51. By providing the B-axis module with both the side tool flange and the bottom tool flange the B-axis module provides an increased level of flexibility to the industrial manipulator on which it is mounted.

Turning now to FIGS. 3 through 9, the seven configurations which are possible through various combinations of the modular units of this invention are individually illustrated. The A-axis only configuration is shown in FIG. 3 and consists of a mounting bracket 21 onto which is mounted the A-axis module 27 by means of mounting plate 29 which is secured to the bottom portion 25 of the mounting bracket. The mounting bracket 21 is mounted on the end of a robotic arm which is not illustrated herein by securing means 23. An end effector or the like is secured to the bottom of the rotating member 31 for rotation about the A-axis indicated by the reference character A.

Figure 5:
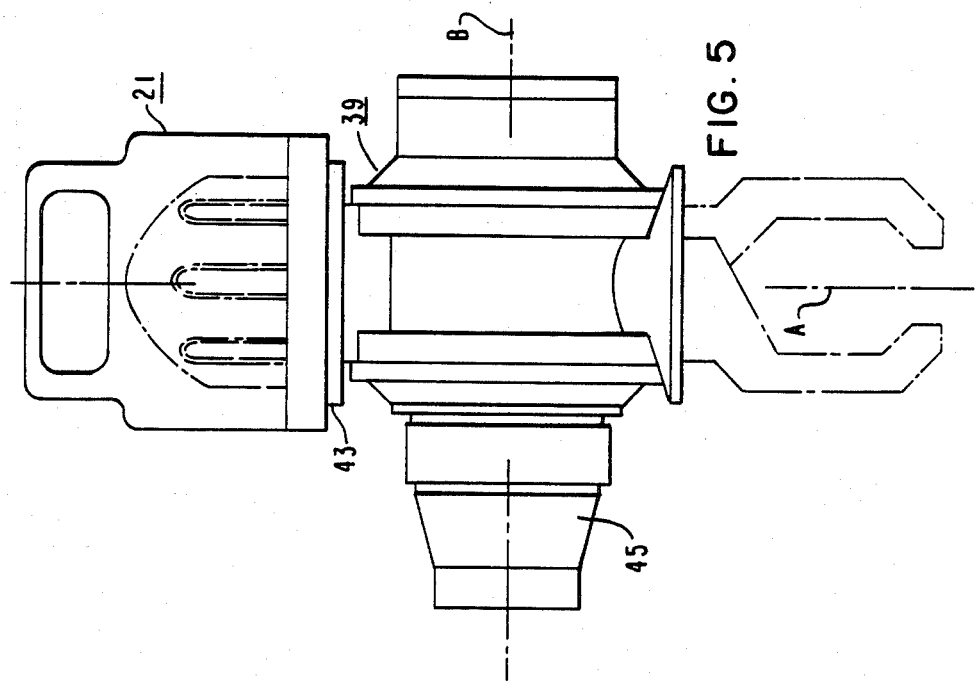
FIG. 5 is an elevational view of a B-axis module with bottom tool flange disposed on a mounting bracket.
Figure 4:
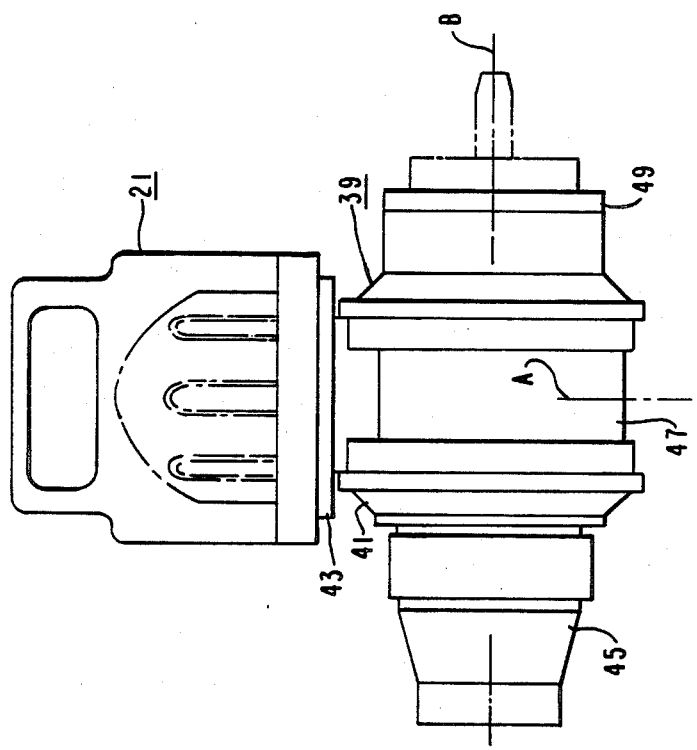
FIG. 4 is an elevational view of the B-axis module with side tool flange disposed on a mounting bracket.

A B-axis side tool flange configuration is shown in FIG. 4. This configuration includes the mounting bracket 21 and the B-axis module 39. The mounting plate 43 of the B-axis housing 41 is secured to the bottom portion 25 of the mounting bracket 21. The mounting bracket in turn is mounted to the end of robotic arm. The rotating member 47 of the B-axis module is equipped with a side tool flange 49 onto which an end effector or the like can be mounted. The end effector is not illustrated herein. The side tool flange mounting configuration permits the rotational movement of an end effector on the B-axis indicated by the reference character B. A B-axis bottom tool flange configuration is shown in FIG. 5. The relationship of the B-axis module 39, the mounting bracket 21 and the robotic arm are the same as illustrated and described in conjunction with FIG. 4. However, in the bottom tool flange configuration, a tool flange 51 is mounted on the rotating member 47 of the B-axis module for rotational movement about the B-axis in a radially spaced relationship therewith. FIG. 6 illustrates the B-axis bottom and side tool flange configuration. This configuration offers maximum flexibility when only the B-axis module is being used. The B-axis module is provided with a side tool flange 49 and a bottom tool flange 51. The side tool flange 49 rotates on the B-axis while the bottom tool flange rotates in a radially spaced relationship with the B-axis. In the configurations shown in FIGS. 4, 5 and 6 it is to be appreciated that the B-axis module mounting plate 43 is fixedly secured to the mounting bracket 21 which is in turn fixedly secured to the end of the robotic arm. As a result, no rotation about what has been described as the first or A-axis is permitted this module. Rotational movement is limited to strictly the B-axis.

Figure 8:
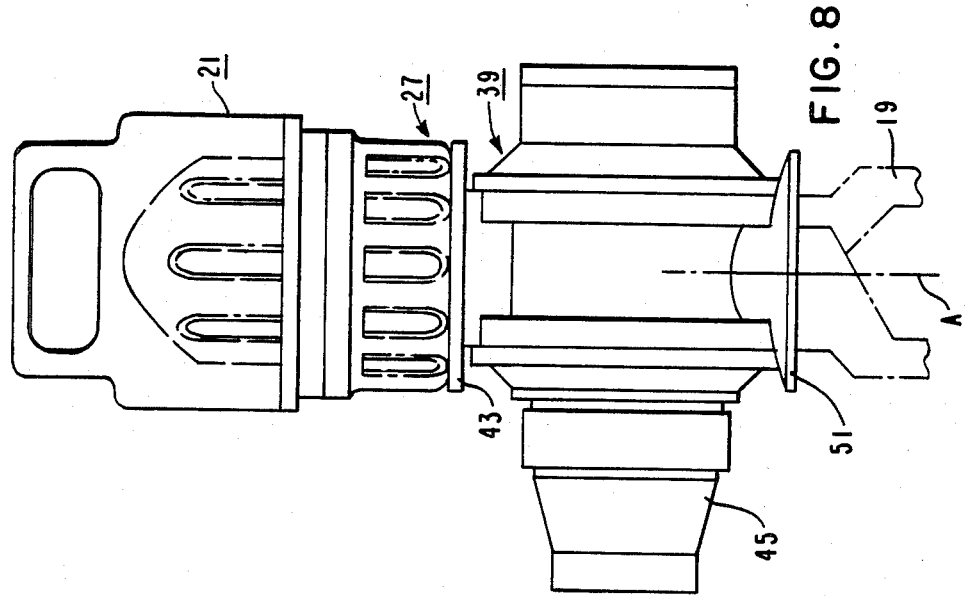
FIG. 8 is an elevational view of an A- and B-axis module disposed from a mounting bracket with the B-axis module equipped with a bottom tool flange.
Figure 7:
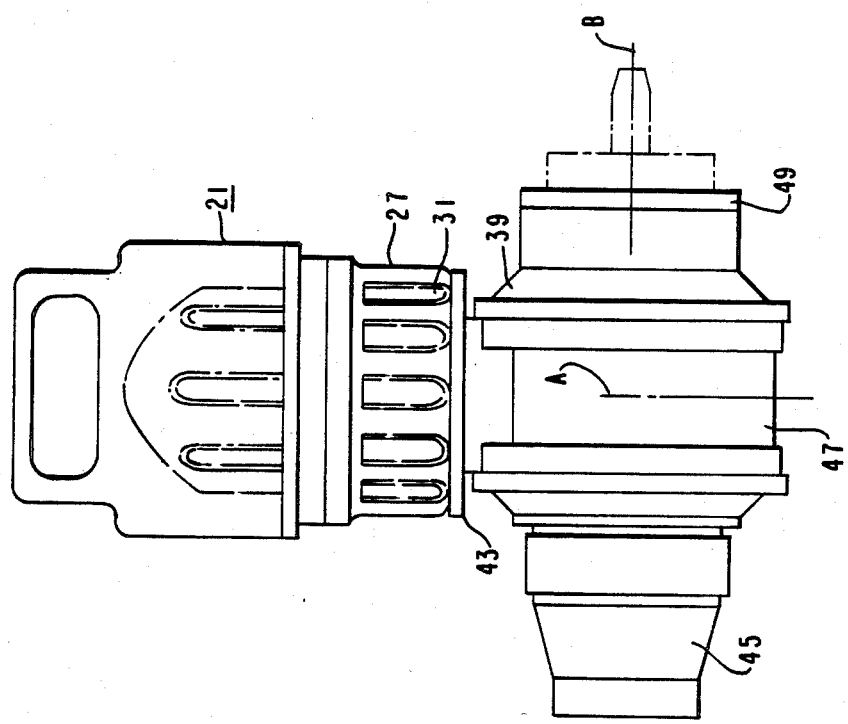
FIG. 7 is an elevational view of the A- and B-axis modules mounted together from a mounting bracket with side tool flange disposed on the B-axis.

FIGS. 7, 8 and 9 represent configurations in which both the A-axis module and B-axis module are simultaneously utilized. In FIG. 7 the mounting bracket 21 supports the A-axis module 27 onto which is rotatably mounted the rotating member 31. The B-axis module is in turn mounted onto the rotating member 31 of the A-axis module by the mounting plate 43 of the B-axis module housing 41. The rotating member 47 of the B-axis module 39 is provided with a side tool flange 49. This A- and B-axis side tool flange configuration permits the manipulation of an end effector secured to the side tool flange 49 in both the A-axis and the B-axis. Thus two full degrees of freedom are provided by the robotic wrist of this invention. The A- and B-axis bottom tool flange configuration is shown in FIG. 8. Here again, the A-axis module permits rotational movement relative to the mounting bracket 21 which is fixedly attached to the end of a robotic arm and the B-axis module 39 permits rotational movement along the B-axis which is substantially perpendicular to the A-axis. The bottom tool flange 51 thus permits radially spaced rotational movement about the B-axis. FIG. 9 illustrates the A- and B-axis bottom and side tool flange configuration which offers maximum flexibility with the modular wrist system of this invention. The mounting bracket 21 secured to the end of robotic arm has an A-axis module mounted thereon and the B-axis module is secured to the rotating member of the A-axis module. This configuration allows the B-axis module to be rotated about the A-axis module while retaining its own capability to provide rotational movement about the B-axis.

Figure 10:
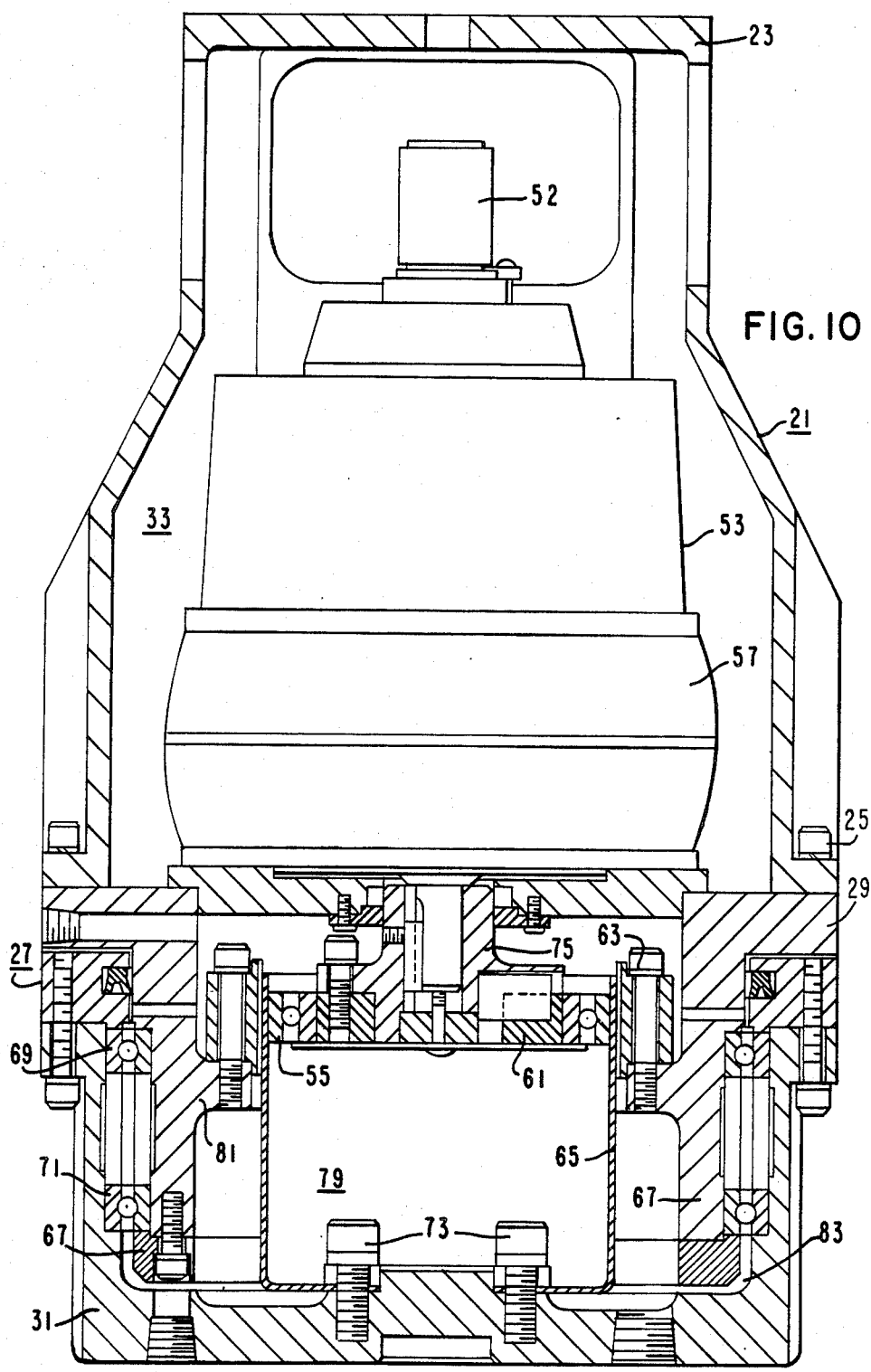
FIG. 10 is a sectional view through an A-axis module illustrating the drive mechanism therein.

The sectional illustration of FIG. 10 illustrates both the mounting bracket 21 and the A-axis module 27 which is operably mounted onto the mounting bracket. The mounting bracket provides the structural support necessary house the drive means 33 of the A-axis module and also provides the securing means 23 located at the upper portion thereof by which the module is fixedly attached to a robot arm. The A-axis module 27 consists of a closed loop DC servo drive arrangement 53 and a harmonic drive unit 55. The DC servo drive arrangement 53 includes a DC drive motor 57 and a resolver 52. Additionally, if desired, a tachometer, which is not illustrated herein, can also be coupled to, or an integral part of, the DC servo drive motor to provide speed feedback information for the control of the wrist. The resolver 59 provides positional feedback information to a control console associated with the robot but not illustrated herein. The harmonic drive unit 55 which functions as a gear reduction unit to provide a 100 to 1 reduction, may be implemented through the use of a harmonic drive unit which is commercially available from the USM corporation.

The harmonic drive unit 55 consisting of a wave generator 61 is a circular spline 63, and a flexible spline 65 is secured within the torque tube 67. The torque tube 67 is rotatably retained by the bearing set comprised of preloaded bearings 69 and 71. The outer race of each of the bearings 69 and 71 is affixed to the rotating member 31 and the inner race of each bearing is affixed to the torque tube 67. The use of preloaded bearings assures a uniform bearing friction by preventing unauthorized access to the preload characteristics of the bearings 69 and 71. The rotating member 31 is attached to the flexible spline 65 by means of the bolts 73.

The motor shaft is directly coupled to the wave generator 61 by the rigid or fixed coupling 75. The direct mechanical connection between the harmonic drive unit and the drive shaft provided by the rigid coupling eliminates backlash and maintains the repeatability and accuracy of the rotating positioning action of the assembly.

The circular spline 63 is attached to the fixed housing 29 and the flexible spline 65 is attached to the rotating housing 31. The circular spline 63 is tightened into place so that relative motion between the circular spline 63 and the fixed housing is essentially eliminated. As the rotating member 31 rotates, the flexible spline 65 functions as a spring member. When the rotating member 31 is rotated into its prescribed position, the spring action of the flexible spline 65 tends to return the assembly to its original position. This "unwinding" action is balanced by the force of friction developed by the bearing set of bearings 69 and 71.

While the combination of the rotating assembly, the harmonic drive unit, the movable housing, motor shaft and fixed coupling establish the spring rate of the apparatus, the stiff design of all but the harmonic drive unit results in the harmonic drive unit being the major contributor to the spring rate. The frictional force of the preloaded bearings is selected to be less than the positioning force resulting from the windup of the harmonic drive unit. The critical selection of bearing preload and friction maintains the system accuracy and repeatability with minimum joint deflection.

The harmonic drive unit 55 is immersed in an oil bath 79. The flexing motion of the flexible spline 65 effectively "pumps" the oil through the apertures 81, the bearings 69 and 71 and the passage 83 in the fixed and movable housing in order to develop an oil circulation path as indicated by the arrows in FIG. 10. The oil circulation removes heat from the oil and prevents undesired pressure buildup in the harmonic drive unit.

Figure 11:
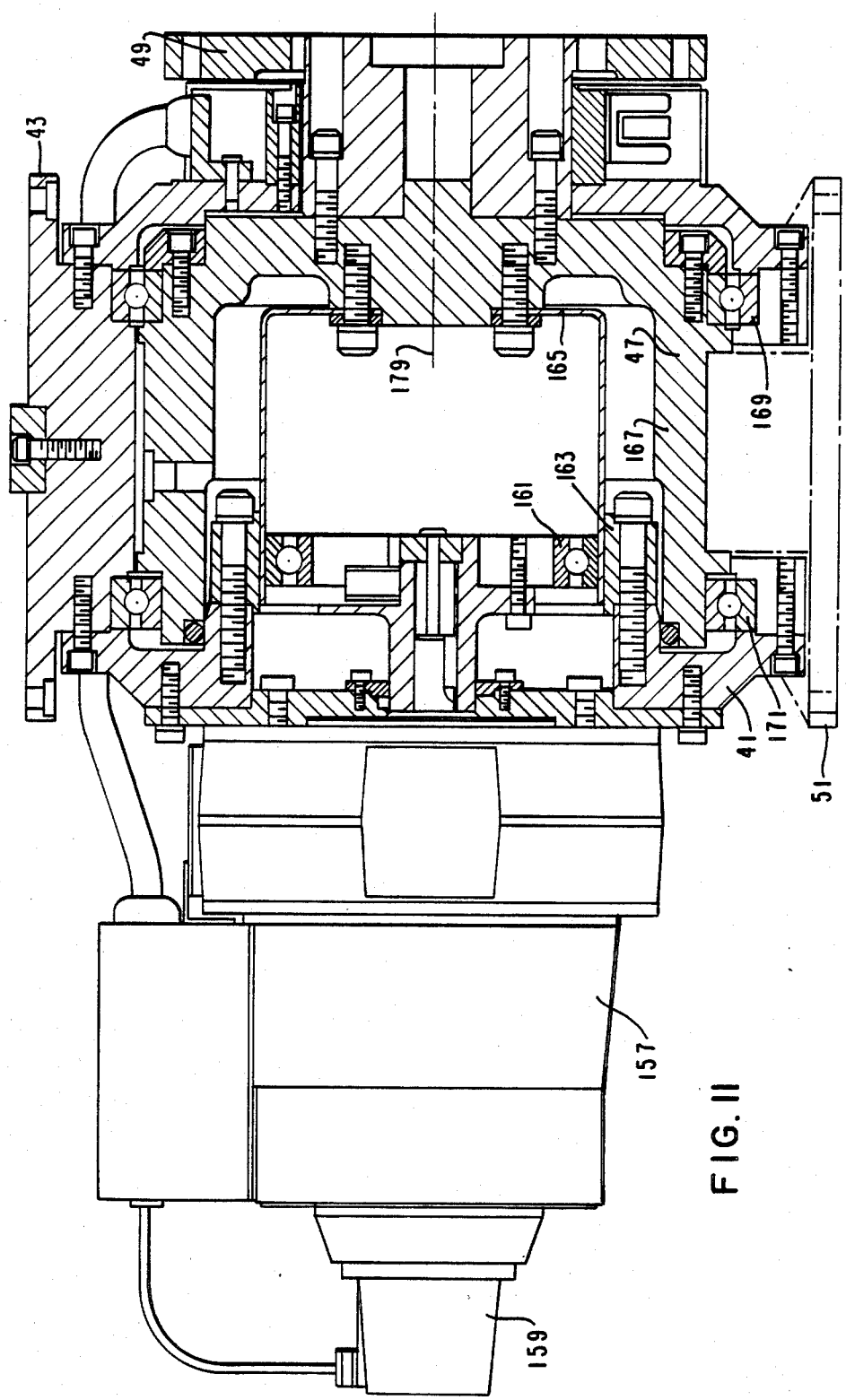
FIG. 11 is a sectional view through a B-axis module equipped with both side tool flange and bottom tool flange illustrating the drive mechanism therein.

A sectional illustration of a B-axis module is shown in FIG. 11 and includes a closed loop DC servo drive arrangement and a harmonic drive unit. The DC servo drive arrangement includes a DC drive motor 157 and a resolver 159. A tachometer which is not illustrated herein can be provided for speed feedback information. The resolver 159 provides positional feedback information. The resolver can be positioned on the output shaft in place of a side tool flange or it can be positioned on the motor shaft as illustrated herein. The harmonic drive unit functions as a gear reduction unit to provide a 100 to 1 reduction. As previously noted, commercially available harmonic drive units well suited for use in the present invention are available.

The harmonic drive unit 155 which consists of a wave generator 161, a circular spline 163 and a flexible spine 165 is secured within the rotating member 47 which functions as a 167 torque tube. The torque tube is rotatably retained within the B-axis housing 41 by the bearing set comprised of preloaded bearings 169 and 171. The outer race of each of the bearings 169 and 171 is affixed to the B-axis housing 41. The inner race of the bearing 171 is secured to the torque tube 167 while the inner race of bearing 169 is allowed to float axially. The use of preloaded bearings assures a uniform bearing friction by preventing unauthorized access to the preload characteristics of the bearings 169 and 171.

A motor shaft which is connected to the wave generator 161 by a rigid or fixed coupling. The operation of the harmonic drive unit is described in conjunction with the A module of FIG. 10 and will not be repeated herein.

The harmonic drive unit of the B-axis module includes an oil bath 179 which is maintained at a predetermined fill level. The flexing motion of the flexible spline 163 effectively "churns" the oil through the harmonic drive unit. This oil circulation removes heat from the oil bath and prevents undesired pressure buildup within the harmonic drive unit.

As can be more clearly seen in FIG. 11 the side mounting tool flange 49 is fixedly attached to the rotating member 47 (torque tube 167) of the B-axis module. Additionally, this sectional view of the B-axis module includes the bottom tool flange 51. It is to be appreciated of course that when the bottom tool flange is utilized, the rotational movement of the bottom tool flange is restricted to about 220 degrees of travel about the B-axis. On the other hand, when only the side tool flange 49 is used on the B-axis unlimited rotation about the B-axis of an end effector mounted onto the side tool flange is possible.

What has been described is a modular multi-flange robotic wrist which provides one or two independent electro-servo-controlled degrees of freedom to enhance the basic motions of an industrial manipulator. The unique construction, including dual tool-mounting flange drives, provides the capability to turn a part upside down with the axis of rotation of the part coincident with either axis of rotation of the wrist. This feature eliminates the need for a three-axis wrist in the majority of robotic applications. Additionally, the use of high-speed, low-torque DC motors coupled to harmonic drive speed reduction units optimizes the output torque to unit weight ratio. The use of position feedback sources on the B-axis permit the matching of wrist performance to application requirements. When position feedback is taken directly off the motor shaft maximum stability is available when accelerating high inertia loads in material handling applications. The modular construction and preloaded bearings provide extreme structural rigidity. When position feedback is taken directly from the output shaft, the deflection effects due to drive train windup when external forces are applied perpendicular to the axis of rotation are minimized.

What is claimed is:

1. A modular robotic wrist system for use with an industrial manipulator or the like comprising:

a mounting bracket defining a chamber-like interior and having first means at one end thereof for attaching said mounting bracket onto an arm of an industrial manipulator, and having second means at the opposite end thereof for removably securing thereto an A-axis wrist module;

said A-axis wrist module which provides a first degree of freedom comprising a mounting plate having means therewith for the detachable mounting of said A-axis module to said mounting bracket second means, a first rotating member rotatably mounted on said mounting plate which first rotating member includes a bottom portion onto which a B-axis module is mounted, and first drive means in mechanical communication therewith for effecting the rotational movement of said rotating member relative to said mounting plate about a first axis of rotation which first axis is generally parallel with the arm of the robot onto which said mounting bracket and said A-axis wrist are mounted and wherein said first drive means is enclosed within said chamber-like interior of said mounting bracket; and said B-axis wrist module which provides a second degree of freedom which is generally perpendicular to said first degree of freedom comprising a housing having a mounting plate for the detachable mounting thereof to said bottom portion of said A-axis wrist module, a second rotating member rotatably mounted in said housing and second drive means disposed in said housing and in mechanical communication with said second rotating member for effecting the rotational movement thereof relative to said housing about a second axis of rotation, said second axis being substantially perpendicular to said first axis of rotation and said B-axis wrist mounting plate and wherein said second rotating member includes a first and a second mounting flange which detachably receives an end effector or the like thereon, said first mounting flange being mounted on said rotating member for radially spaced rotation about said second axis and said second mounting flange being mounted on said second rotating member for rotation on said axis.

2. The modular robotic wrist system according to claim 1 wherein the first drive means attached to the A-axis first wrist module includes a DC servo drive motor.

3. The modular robotic wrist system according to claim 2 wherein the first drive means includes a harmonic drive unit, driven by the DC servo drive motor.

4. The modular robotic wrist system according to claim 2 wherein the first drive means includes a means in communication with the DC servo drive motor to provide positional information.

5. The modular robotic wrist system according to claim 1 wherein the second drive means attached to the B-axis wrist module includes a DC servo drive motor.

6. The modular robotic wrist system according to claim 5 wherein the second drive means includes a harmonic drive unit driven by the DC servo motor.

7. The modular robotic wrist system according to claim 5 the second drive means includes a means in communication therewith to provide positional information.

* * * * *